United States Patent
Yasunaga

(10) Patent No.: US 10,322,555 B2
(45) Date of Patent: Jun. 18, 2019

(54) METHOD AND DEVICE FOR MOUNTING FILLER TO BEAD CORE

(71) Applicants: FUJI SEIKO CO., LTD., Hashima-Shi, Gifu-Ken (JP); FUJI SHOJI CO., Ltd., Hashima-Shi, Gifu-Ken (JP)

(72) Inventor: Toshihide Yasunaga, Hashima (JP)

(73) Assignees: FUJI SEIKO CO., LTD. (JP); FUJI SHOJI CO., LTD. (JP)

( * ) Notice: Subject to any disclaimer, the term of this patent is extended or adjusted under 35 U.S.C. 154(b) by 223 days.

(21) Appl. No.: 15/025,789

(22) PCT Filed: Oct. 3, 2013

(86) PCT No.: PCT/JP2013/076990
§ 371 (c)(1),
(2) Date: Mar. 29, 2016

(87) PCT Pub. No.: WO2015/049768
PCT Pub. Date: Apr. 9, 2015

(65) Prior Publication Data
US 2016/0236433 A1    Aug. 18, 2016

(51) Int. Cl.
*B29D 30/48* (2006.01)
*B29C 65/48* (2006.01)
(Continued)

(52) U.S. Cl.
CPC .......... *B29D 30/48* (2013.01); *B29C 65/4805* (2013.01); *B29C 66/532* (2013.01);
(Continued)

(58) Field of Classification Search
CPC .............. B29D 30/48; B29D 2030/482; B29D 2030/481; B29D 2030/0044;
(Continued)

(56) References Cited

U.S. PATENT DOCUMENTS 3,815,173 A    6/1974  Haussels
4,354,892 A *  10/1982 Tarantola ............... B29D 30/48
                                                156/136

(Continued)

FOREIGN PATENT DOCUMENTS

CN        101454146 A    6/2009
CN     2010-162997 A    7/2010
(Continued)

OTHER PUBLICATIONS

Tsuda Hideo, JP 2002-096401, Apr. 2002, machine translation.*
(Continued)

*Primary Examiner* — Robert C Dye
*Assistant Examiner* — Sedef E Paquette
(74) *Attorney, Agent, or Firm* — Tarolli, Sundheim, Covell & Tummino LLP

(57) ABSTRACT

A method for annularly mounting a band-like filler to the outer periphery of a bead core comprises a step for attaching the filler to the outer periphery of the bead core, a step for grasping the opposite ends of the filler and separating the opposite ends of the filler from the outer periphery of the bead core, a step for sequentially attaching the opposite end surfaces of the filler to each other from the inner peripheral sections of the opposite end surfaces toward the outer peripheral sections thereof, and a step for pressing the portion of the filler, which has been separated from the outer periphery of the bead core, against the outer periphery of the bead core.

3 Claims, 5 Drawing Sheets

(51) Int. Cl.
*B29C 65/00* (2006.01)
*B29D 30/26* (2006.01)
*B29L 30/00* (2006.01)

(52) U.S. Cl.
CPC .... *B29C 66/834* (2013.01); *B29D 2030/2685* (2013.01); *B29D 2030/482* (2013.01); *B29L 2030/001* (2013.01)

(58) Field of Classification Search
CPC ........ B29D 2030/2685; B29C 65/4805; B29C 66/532; B29C 66/834; B29L 2030/001
USPC ................ 156/136, 157, 398, 460, 495, 502
See application file for complete search history.

(56) References Cited

U.S. PATENT DOCUMENTS

| | | | |
|---|---|---|---|
| 4,994,136 A * | 2/1991 | Pizzorno | B29D 30/42 156/398 |
| 5,108,538 A * | 4/1992 | Kokubu | B29D 30/48 156/422 |
| 5,203,938 A | 4/1993 | Moody et al. | |
| 5,989,374 A * | 11/1999 | Bull | B29D 30/48 156/136 |
| 2006/0055082 A1 | 3/2006 | Kudo et al. | |
| 2009/0183820 A1 | 7/2009 | Sawada | |
| 2009/0266474 A1 | 10/2009 | Matsuyama et al. | |
| 2010/0181000 A1 | 7/2010 | Takahashi | |

FOREIGN PATENT DOCUMENTS

| | | | |
|---|---|---|---|
| CN | 101823409 A | | 9/2010 |
| JP | 58126139 A | * | 7/1983 |
| JP | 63-33924 U | | 3/1988 |
| JP | 2-20331 A | | 1/1990 |
| JP | 10-86220 A | | 4/1998 |
| JP | H11-105154 A | | 4/1999 |
| JP | 2002-96401 A | | 4/2002 |
| JP | 2006-76217 A | | 3/2006 |
| WO | WO 2008/010293 A1 | | 1/2008 |

OTHER PUBLICATIONS

Tatsuzou Samano, JP 58126139, machine translation. (Year: 1983).*
Office Action for Russian Application No. 2016116279 dated Jul. 6, 2017.
International Preliminary Report on Patentability for Application No. PCT/JP2013/076990 dated Apr. 5, 2016.
International Search Report for Application No. PCT/JP2013/076990 dated Dec. 17, 2013.
Chinese Office Action for Application No. 201380079964.3 dated Apr. 12, 2017.

* cited by examiner

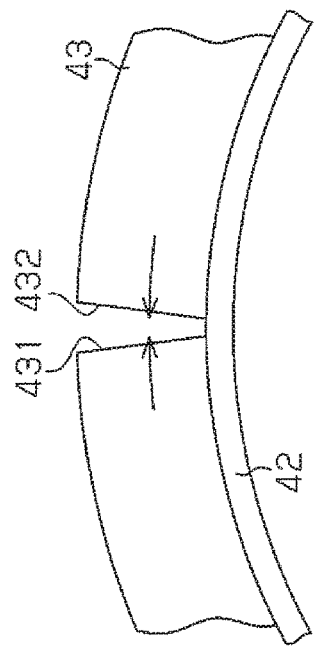
Fig.7A (Prior Art)
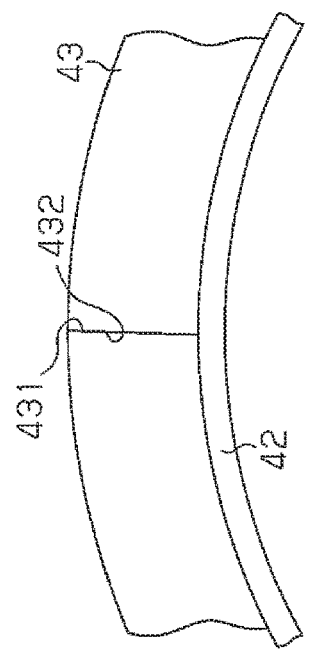
Fig.7B (Prior Art)
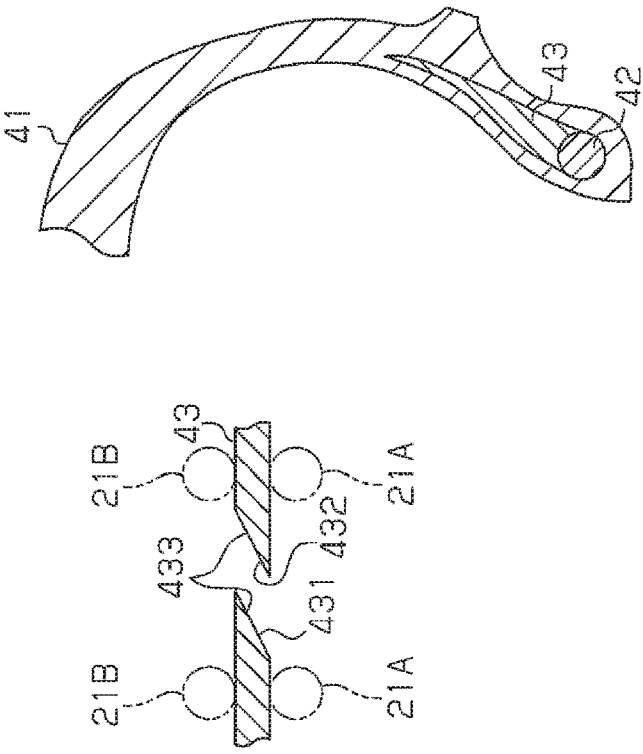
Fig.6 (Prior Art)
Fig.5

METHOD AND DEVICE FOR MOUNTING FILLER TO BEAD CORE

RELATED APPLICATIONS

The present invention is a U.S. National Stage under 35 USC 371 patent application, claiming priority to Ser. No. PCT/JP2013/076990, filed on 3 Oct. 2013; the entirety of which is incorporated herein by reference.

BACKGROUND OF THE INVENTION

The present invention relates to a method and a device for mounting a strip of a filler onto the outer circumference of a bead core used in, for example, a vehicle tire.

Patent document 1 discloses a technique for mounting a filler onto a bead core. Referring to FIG. 6, in a vehicle tire, each side surface of a tire rubber 41 includes an inner circumferential rim. A bead core 42 and a filler 43 are embedded in the inner circumferential rim in annular forms. As described in patent document 1, the filler 43 has the form of a strip. Referring to FIG. 7A, the filler 43 is adhered in advance to the outer circumference of the bead core 42. Then, referring to FIG. 7B, two end surfaces 431 and 432 of the filler 43 are adhered to each other so that the filler 43 is mounted onto the outer circumference of the bead core 42 in an annular form.

PRIOR ART DOCUMENT

Patent Document

Patent Document 1: Japanese Laid-Open Patent Publication No. 11-105154

SUMMARY OF THE INVENTION

In the prior art, when mounting the filler 43 onto the bead core 42, the two end surfaces 431 and 432 are manually adhered to each other. More specifically, in a state in which the filler 43 is adhered to the outer circumference of the bead core 42 as shown in FIG. 7A, the two ends of the filler 43 are manually pulled toward each other and adhered to each other as shown in FIG. 7B.

Thus, the prior art method for mounting a filler onto a bead core is burdensome and requires skill for uniformly adhering the two end surfaces 431 and 432 of the filler 43 to each other.

Accordingly, the present invention focuses on the shortcoming of the prior art. It is an object of the present invention to provide a method and device for mounting a filler onto a bead core that allows the two end surfaces of the filler to be attached to each other easily and accurately without requiring skill.

To achieve the above object, one aspect of the present invention provides a method for mounting a strip of a filler in an annular form onto an outer circumference of a bead core. The method includes the steps of adhering the filler to the outer circumference of the bead core with two end surfaces of the filler separated from each other, holding two ends of the filler and separating the two ends from the outer circumference of the bead core, adhering the two end surfaces of the filler to each other sequentially from their inner circumferential portions to their outer circumferential portions, and pressing a portion of the filler, which has been separated from the outer circumference of the bead core, against the outer circumference of the bead core.

In the method for mounting a filler onto a bead core, while holding the two ends of the filler, which is adhered to the outer circumference of the bead core, the two ends are temporarily separated from the outer circumference of the bead core and pulled toward each other. This allows the two end surfaces of the filler to be adhered to each other easily and accurately without requiring skill.

A further aspect provides a device for mounting a filler onto an outer circumference of a bead core. The device includes two pairs of jaws, a first movement member, a second movement member, and a third movement member. The two pairs of jaws respectively hold two ends of the filler, which is adhered to the outer circumference of the bead core. The first movement member moves the two pairs of jaws away from the bead core and outward in a radial direction of the bead core while the two pairs of jaws are holding the two ends of the filler. The second movement member moves at least one of the two pairs of jaws, which have been moved by the first movement member, toward the other pair of jaws about a shaft located at an inner side of the filler. The third movement member moves the two pairs of jaws, which have been moved by the second movement member, toward the bead core.

Accordingly, the device for mounting a filler onto a bead core allows the two end surfaces of the filler to be automatically adhered to each other.

The method and device for mounting a filler to a bead core according to the present invention allows the two end surfaces of the filler to be attached to each other easily and accurately without requiring skill.

BRIEF DESCRIPTION OF THE DRAWINGS

FIG. 5 is a partially enlarged cross-sectional view taken along line 5-5 in FIG. 4A.

FIG. 6 is a cross-sectional view showing a portion of a vehicle tire.

FIGS. 7A and 7B are partial front views illustrating a method for mounting a filler onto a bead core in the prior art.

DETAILED DESCRIPTION OF THE PREFERRED EMBODIMENTS

One embodiment of a method and device for mounting a filler onto a bead core will now be described with reference to the drawings.

Figure 1:
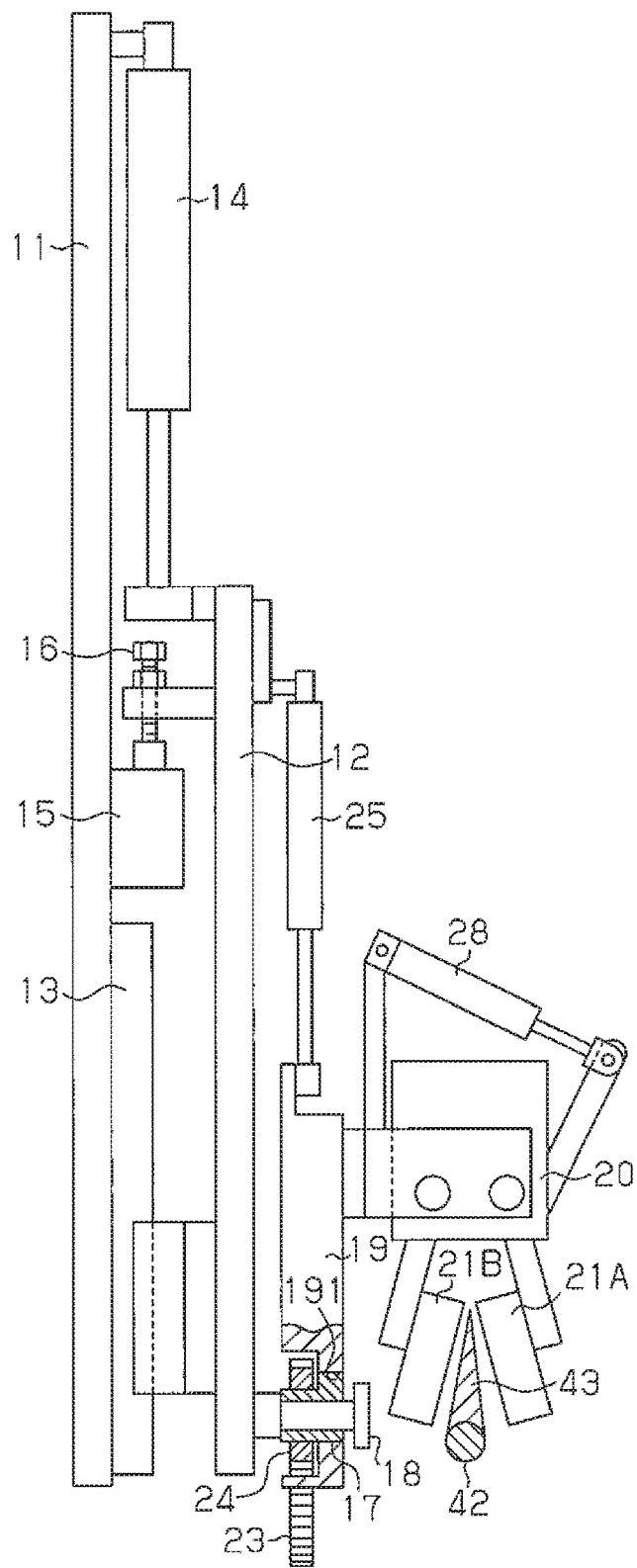
FIG. 1 is a side view showing one embodiment of a device for mounting a filler onto a bead core.
Figure 2:
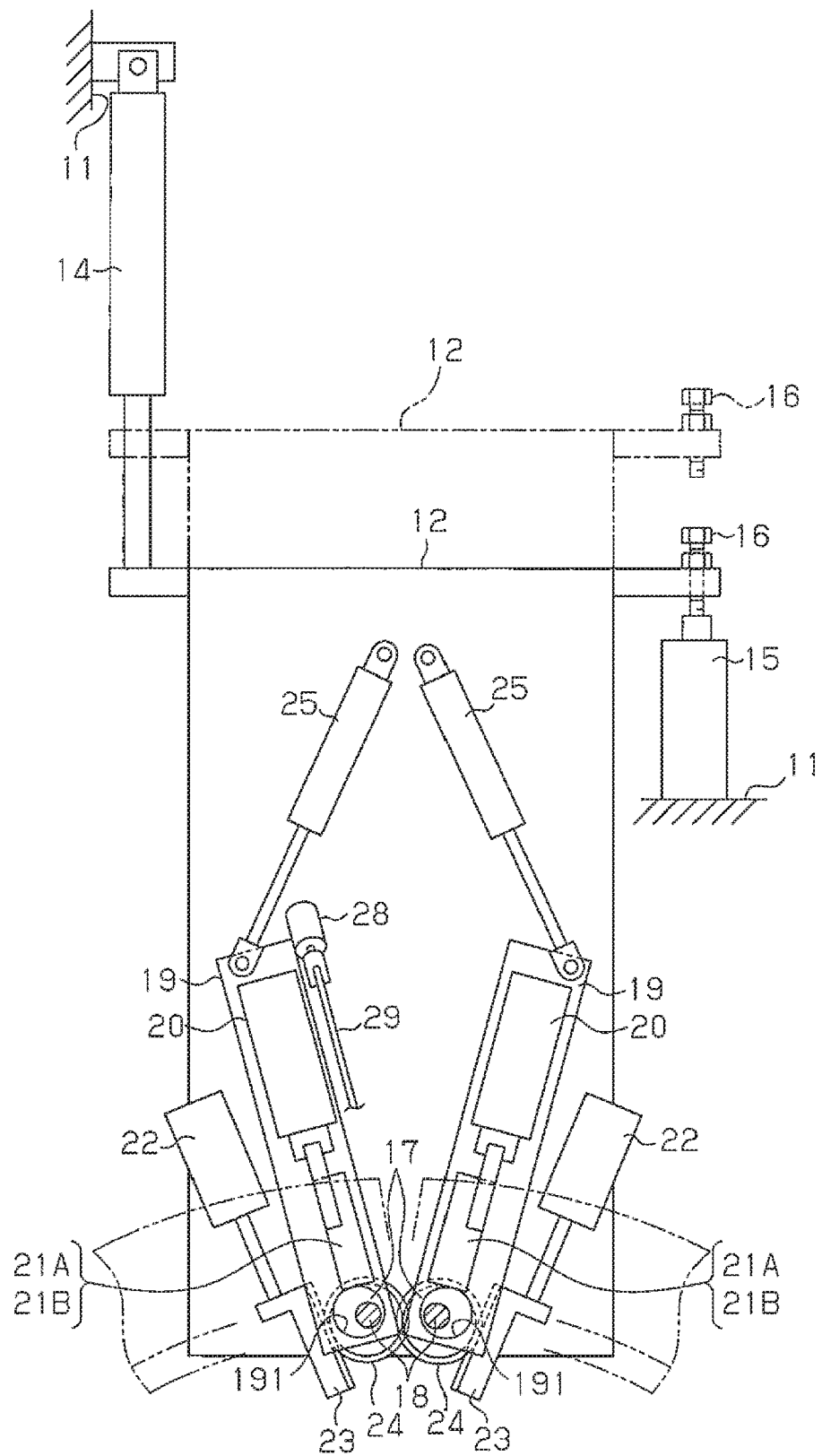
FIG. 2 is a front view of the filler mounting device shown in FIG. 1.
Figure 4A:
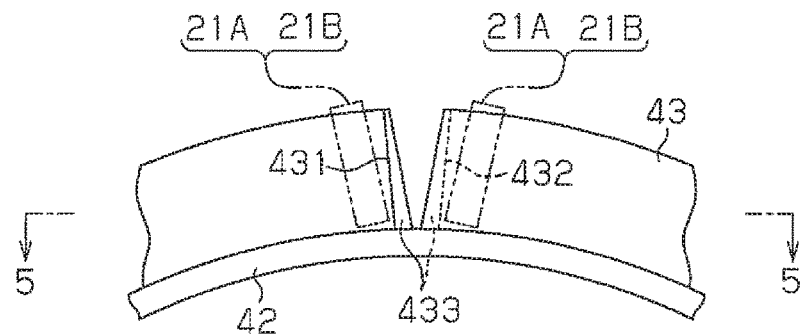
FIGS. 4A to 4D are partial front views showing the procedures for adhering the end surfaces of a filler.

As shown in FIGS. 1 and 2, a base plate 11 has a front surface that supports a movable plate 12 to be movable along a guide rail 13 in the vertical direction as viewed in FIGS. 1 and 2. In a state in which a strip of a filler 43 is adhered in an annular form to the outer circumference of a bead core 42, two end surfaces 431 and 432 of the filler 43 are located in front of the lower end of the base plate 11. Here, the two end surfaces 431 and 432 of the filler 43 are separated from each other. As shown in FIGS. 4A and 5, the end surfaces 431 and 432 of the filler 43 each include an inclined surface 433 that is inclined in the thickness-wise direction of the filler 43. In detail, each of the end surfaces 431 and 432 of the filler 43 defines the inclined surface 433 that is inclined toward the distal edge so that the thickness of the filler 43 is gradually reduced. The inclined surfaces 433 of the end surfaces 431 and 432 of the filler 43 are opposed to each other.

As shown in FIGS. 1 and 2, a first cylinder 14 is arranged on the base plate 11 to move the movable plate 12. A stopper bolt 16 is fixed to a portion of the movable plate 12. A second cylinder 15 arranged on the base plate 11 includes a piston rod that can contact the lower end of the stopper bolt 16. The second cylinder 15 cooperates with the stopper bolt 16 to restrict movement of the movable plate 12 between two positions. A piston rod is projected out of or retracted into each of the first cylinder 14 and the second cylinder 15 to move the movable plate 12 between an operation position, which is shown by solid lines in FIG. 2, and a withdrawn position, which is shown by the double-dashed lines in FIG. 2. The second cylinder 15 has a stronger force than the first cylinder 14. Thus, when the piston rod of the second cylinder 15 is projected, the distal end of the piston rod lifts the lower end of the stopper bolt 16 and moves the movable plate 12 from the operation position to the withdrawn position. When the piston rod of the second cylinder 15 is retracted, the distal end of the piston rod is moved away from the lower end of the stopper bolt 16 of the movable plate 12 to the position shown by the solid lines in FIG. 2 and then stopped. Further, the piston rod of the first cylinder 14 is projected to move the movable plate 12 from the withdrawn position to the operation position. At the operation position, the lower end of the stopper bolt 16 contacts the distal end of the piston rod of the second cylinder 15, which is stopped at the position shown by the solid lines in FIG. 2. This stops the movement of the movable plate 12.

Two eccentric camshafts 17 (shafts) are supported by the base plate 11 rotationally about support shafts 18 at positions corresponding to the inner circumferential portion of the two ends of the filler 43. The eccentric camshafts 17 are engaged with engagement bores 191 formed in the ends of two support plates 19. In this state, each support plate 19 is pivotally supported by the corresponding eccentric camshaft 17 on the movable plate 12 in a plane parallel to the plane of FIG. 2.

As shown in FIGS. 1 and 2, a third cylinder 20 is held on each support plate 19. Each third cylinder 20 supports two jaws 21A and 21B. The two pairs of jaws 21A and 21B respectively hold the two ends of the filler 43. Each third cylinder 20 functions to move the corresponding pair of jaws 21A and 21B between a holding position and a non-holding position. At the holding position, the jaws 21A and 21B of each pair hold the front surface and rear surface of one end of the filler 43 as shown in FIGS. 4A and 5. At the non-holding position, the jaws 21A and 21B of each pair are separated from the front surface and rear surface of one end of the filler 43 as shown in FIG. 1.

Figure 4B:
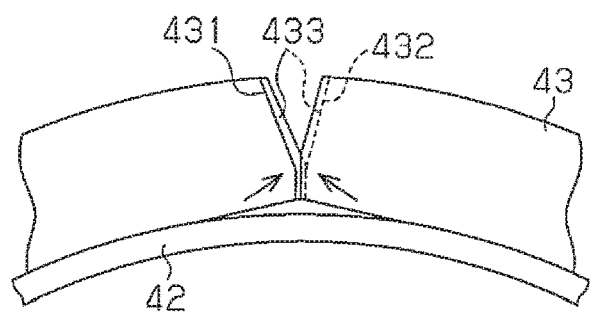

Two fourth cylinders 22 are arranged on the movable plate 12 to rotate the eccentric camshafts 17. The piston rod of each fourth cylinder 22 is retracted from the position shown in FIG. 2 to rotate the eccentric camshaft 17 with a rack 23 and a pinion 24. This moves the corresponding support plate 19 toward the upper side as viewed in FIG. 2. When the jaws 21A and 21B hold the two ends of the filler 43, the fourth cylinders 22 are actuated to retract the corresponding piston rods and move the jaws 21A and 21B away from the bead core 42 outward in the radial direction of the bead core 42. That is, the two ends of the filler 43 held by the jaws 21A and 21B are separated from the outer circumference of the bead core 42 as shown in FIG. 4B. The fourth cylinders 22 each define a first movement member that moves the corresponding jaws 21A and 21B, while holding the filler 43, outward in the radial direction of the bead core 42 and away from the outer circumference of the bead core 42.

Figure 4C:
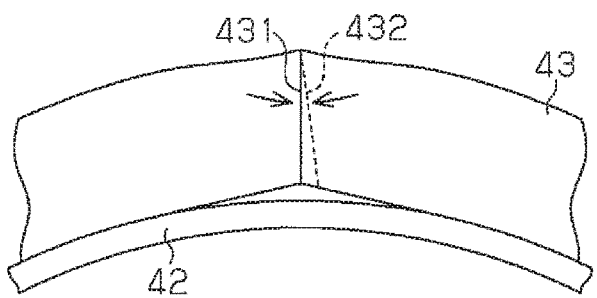

As shown in FIGS. 1 and 2, two fifth cylinders 25 are arranged on the movable plate 12 to pivot the support plates 19. When the jaws 21A and 21B are moved by the fourth cylinders 22 outward in the radial direction of the bead core 42, the fifth cylinders 25 are actuated to retract the corresponding piston rods from the state shown in FIG. 2. This pivots the support plates 19 about the eccentric camshafts 17 and moves the jaws 21A and 21B toward each other. Consequently, as shown in FIG. 4C, the two end surfaces 431 and 432 of the filler 43 are moved toward each other sequentially from their inner circumferential portions toward their outer circumferential portions and adhered to each other. The fifth cylinders 25 each define a second movement member that moves at least one pair of the jaws 21A and 21B toward the other pair of the jaws 21B and 21A.

Figure 4D:
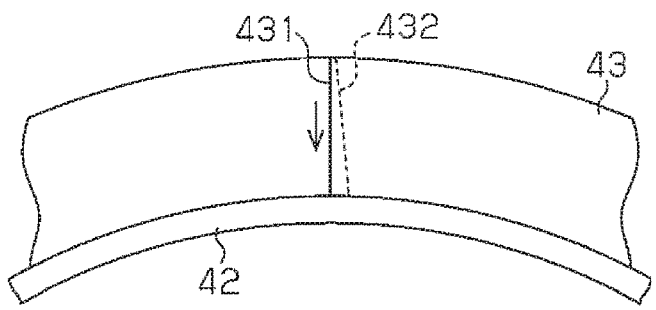

In the present embodiment, the fourth cylinders 22 each function as a third movement member that moves the corresponding jaws 21A and 21B toward the bead core 42. When the jaws 21A and 21B are holding the filler 43, the piston rods of the fourth cylinders 22 are projected to move the jaws 21A and 21B toward the bead core 42. As a result, the portion of the filler 43 that has been separated from the outer circumference of the bead core 42 is pressed against the outer surface of the bead core 42, as shown in FIG. 4D.

Figure 3:
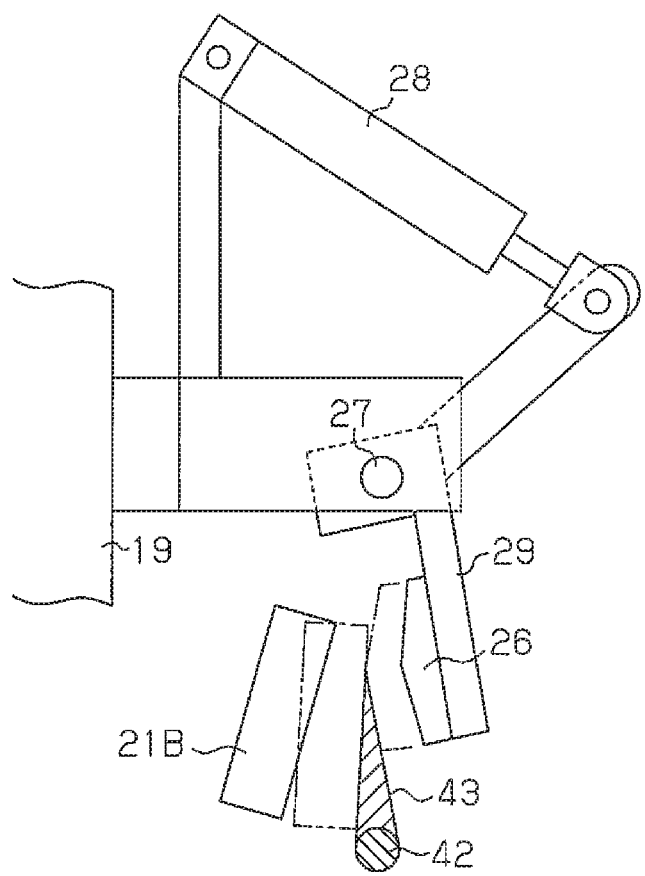
FIG. 3 is an enlarged side view showing a mechanism that presses adhered portions of end surfaces of a filler.

As shown in FIG. 3, one of the two support plates 19 supports a lever 29 pivotally about a support shaft 27. The lever 29 includes a pressing member 26. A sixth cylinder 28 is arranged on the same support plate 19 to pivot the lever 29. When the filler 43 is pressed against the outer circumference of the bead core 42 by the first cylinder 14, the piston rod of the sixth cylinder 28 is projected from the state shown in FIG. 3 to pivot the pressing member 26 about the support shaft 27 in the clockwise direction as viewed in FIG. 3. This presses the adhered portions of the two end surfaces 431 and 432 between the pressing member 26 and the opposing jaw 21B.

A method for mounting a filler onto a bead core with the filler mounting device described above will now be described.

When the filler mounting device is deactivated, the piston rod of the first cylinder 14 is retracted, and the piston rod of the second cylinder 15 is projected. Thus, the lower end of the stopper bolt 16 is lifted by the distal end of the piston rod of the second cylinder 15, and the movable plate 12 is located at the withdrawn position shown by the double-dashed lines in FIG. 2.

In this state, the two end surfaces 431 and 432 of the filler 43, which is adhered in an annular form to the outer circumference of the bead core 42, is arranged in front of an end of the base plate 11. Then, the piston rod of the second cylinder 15 is retracted, and the piston rod of the first cylinder 14 is projected. Contact of the distal end of the piston rod of the second cylinder 15 with the lower end of the stopper bolt 16 positions the movable plate 12 at the operation position shown by the solid lines in FIG. 2. The two pairs of the jaws 21A and 21B are respectively supported by the two support plates 19 of the movable plate 12. When the movable plate 12 is located at the operation position, the two pairs of the jaws 21A and 21B, which are opposed to the two ends of the filler 43, are separated from the front surface and the rear surface of the two ends of the filler 43.

Subsequently, the third cylinder 20 on each support plate 19 is actuated to move the corresponding jaws 21A and 21B toward the front surface and the rear surface of the filler 43 so that the ends of the filler 43 are held by the jaws 21A and 21B, as shown in FIGS. 4A and 5. Then, the piston rods of the fourth cylinders 22 on the movable plate 12 are retracted to rotate the eccentric camshafts 17 with the racks 23 and the pinions 24 and move the support plates 19 toward the upper side as viewed in FIG. 2. This moves the jaws 21A and 21B, which are holding the two ends of the filler 43, outward in the radial direction of the bead core 42 and separates the two ends of the filler 43 from the outer circumference of the bead core 42.

Then, in a state in which the jaws 21A and 21B have been moved by the retraction of the piston rods of the fourth cylinders 22, each fifth cylinder 25 on the movable plate 12 is actuated to retract the corresponding piston rod. This pivots each support plate 19 about the corresponding eccentric camshaft 17, which is located closer to the bead core 42 than the filler 43. Further, the two pairs of the jaws 21A and 21B are moved toward each other while holding the two ends of the filler 43. Referring to FIG. 4C, this pivots and moves the two end surfaces 431 and 432 of the filler 43 toward each other about the eccentric camshafts 17. The two end surfaces 431 and 432 are sequentially adhered to each other from their inner circumferential portions toward their outer circumferential portions.

In a state in which the jaws 21A and 21B are moved by the fifth cylinders 25, the piston rods of the fourth cylinders 22 are projected. Thus, the jaws 21A and 21B, which are holding the two ends of the filler 43, are moved toward the bead core 42. Referring to FIG. 4D, this presses and adheres the portion of the filler 43 that has been separated from the outer circumference of the bead core 42 against the outer circumference of the bead core 42.

In a state in which the filler 43 is pressed against the outer circumference of the bead core 42, the piston rod of the sixth cylinder 28 on one of the support plates 19 is projected to pivot the pressing member 26 in the clockwise direction as viewed in FIG. 3. As a result, the adhered portions of the two end surfaces 431 and 432 of the filler 43 are pressed and flattened between the pressing member 26 and the opposing jaw 21b.

After the adhesion of the filler 43 is completed as described above, the piston rods of the third cylinders 20 are retracted to open the jaws 21A and 21B. Further, the piston rods of the fourth cylinders 22 are retracted to withdraw the jaws 21A and 21B, and the piston rods of the fifth cylinders 25 are projected to move the two pairs of the jaws 21A and 21B away from each other as shown by the double-dashed lines in FIG. 4A. Further, the sixth cylinder 28 moves the pressing member 26 to a withdrawn position. Then, the piston rod of the second cylinder 15 is projected to move the movable plate 12 to the withdrawn position shown by the double-dashed lines in FIG. 2. In this state, the device stands by for the next adhesion.

Accordingly, the present embodiment has the advantages described below.

(1) The method for mounting a filler onto a bead core in the present embodiment includes the steps of adhering a strip of the filler 43 to the outer circumference of the bead core 42 with the two end surfaces 431 and 432 of the filler 43 separated from each other, holding the two ends of the filler 43 and separating the two ends from the outer circumference of the bead core 42, adhering the two end surfaces 431 and 432 of the filler 43 to each other sequentially from their inner circumferential portions to their outer circumferential portions, and pressing the portion of the filler 43, which has been separated from the outer circumference of the bead core 42, against the outer circumference of the bead core 42.

Thus, the method for mounting a filler onto a bead core temporarily separates the two ends of the filler 43, which is adhered to the outer circumference of the bead core 42, from the outer circumference of the bead core 42 while holding the two ends. Under this situation, the two ends of the filler 43 are pulled toward each other. This easily and accurately adheres the two end surfaces 431 and 432 of the filler 43 to each other without requiring skill (2) In the filler mounting method of the present embodiment, the end surfaces 431 and 432 of the filler 43 each include the inclined surface 433, which is inclined in the thickness-wise direction of the filler 43. Further, the inclined surfaces 433 of the two end surfaces 431 and 432 of the filler 43 are adhered to each other. This obtains a large area for the adhering surfaces of the filler 43 and allows the two ends of the filler 43 to be firmly adhered to each other.

(3) The device for mounting a filler onto a bead core in the present embodiment includes the two pairs of the jaws 21A and 21B, the first movement members 22, the second movement members 25, and the third movement members 22. The two pairs of the jaws 21A and 21B respectively hold the two ends of the filler 43 that have been adhered to the outer circumference of the bead core 42. The first movement members 22 move the two pairs of the jaws 21A and 21B away from the bead core 42 and outward in the radial direction of the bead core 42 while the two pairs of the jaws 21A and 21B are holding the two ends of the filler 43. The second movement members 25 move at least one of the two pairs of the jaws 21A and 21B, which have been moved by the first movement members 22, toward the other pair of the jaws 21B and 21A about a shaft located at the inner side of the filler 43. The third movement members 22 move the two pairs of the jaws 21A and 21B, which have been moved by the second movement members 25 toward the bead core 42.

Thus, the device for mounting a filler onto a bead core allows the two end surfaces 431 and 432 of the filler 43 to be automatically adhered to each other with high accuracy.

Modified Example

The present embodiment may be modified as described below.

In the above embodiment, the fifth cylinder 25, which serves as the second movement member, may be arranged on just one of the support plates 19. In this case, when the piston rod of the fifth cylinder 25 is retracted, one pair of the jaws 21A and 21B is moved toward the other pair of the jaws 21A and 21B.

The sixth cylinder 28 and the pressing member 26 may be omitted.

The cylinder of the above embodiment may be changed to a different actuator such as a motor.

DESCRIPTION OF REFERENCE CHARACTERS 11) base plate, 12) movable plate, 14) first cylinder, 15) second cylinder, 17) eccentric camshaft (shaft), 19) support plate, 20) third cylinder, 21A and 21B) jaws, 22) fourth cylinder (first movement member and third movement member), 23) rack, 24) pinion, 25) fifth cylinder (second movement member), 42) bead core, 43) filler, 431 and 432) end surfaces, 433) inclined surface.

The invention claimed is:

1. A method for mounting a strip of a filler in an annular form onto an outer circumference of a bead core with a filler mounting device, wherein the filler mounting device includes:
   a base plate;
   two eccentric camshafts that are rotationally supported by the base plate, the two eccentric camshafts being located at an inner side of the filler;
   two support plates each having an engagement bore, wherein each eccentric camshaft is engaged with the engagement bore of a corresponding one of the support plates;
   two actuators each being held on a corresponding one of the support plates;
   two pairs of jaws that respectively hold two ends of the filler, which is adhered to the outer circumference of the bead core, wherein each pair of jaws is supported by a corresponding one of the actuators and is moved by the actuator between a holding position and a non-holding position, and two jaws of each pair hold one of the two ends of the filler at the holding position and are separated from the end at the non-holding position;
   two first movement members, wherein each first movement member rotates a corresponding one of the eccentric camshafts to move the corresponding pair of jaws away from the bead core and outward in a radial direction of the bead core while the pair of jaws is holding one of the two ends of the filler;
   two second movement members, wherein each second movement member pivots a corresponding one of the support plates about the corresponding eccentric camshaft to move the corresponding pair of jaws, which has been moved by the corresponding first movement member, toward the other pair of jaws about the eccentric camshaft; and
   two third movement members, wherein each third movement member moves a corresponding one of the pairs of jaws, which has been moved by the corresponding second movement member, toward the bead core,
the method comprising the steps of:
   adhering the filler to the outer circumference of the bead core with two end surfaces of the filler separated from each other;
   actuating the actuators so that the two pairs of jaws hold the two ends of the filler from opposite sides in a thickness-wise direction of the filler and actuating the first movement members to rotate the eccentric camshafts and move the two pair of jaws outward in the radial direction of the bead core, thereby separating the two ends from the outer circumference of the bead core;
   actuating the second movement members to pivot the support plates about the eccentric camshafts and move the two pair of jaws toward each other about the eccentric camshafts, thereby adhering the two end surfaces of the filler to each other sequentially from their inner circumferential portions to their outer circumferential portions; and
   actuating the third movement members to move the two pair of jaws toward the bead core, thereby pressing a portion of the filler, which has been separated from the outer circumference of the bead core, against the outer circumference of the bead core.

2. A device for mounting a filler onto an outer circumference of a bead core, the device comprising:
   a base plate;
   two eccentric camshafts that are rotationally supported by the base plate, the two eccentric camshafts being located at an inner side of the filler;
   two support plates each having an engagement bore, wherein each eccentric camshaft is engaged with the engagement bore of a corresponding one of the support plates;
   two actuators each being held on a corresponding one of the support plates;
   two pairs of jaws that respectively hold two ends of the filler, which is adhered to the outer circumference of the bead core, wherein each pair of jaws is supported by a corresponding one of the actuators and is moved by the actuator between a holding position and a non-holding position, and two jaws of each pair hold one of the two ends of the filler at the holding position and are separated from the end at the non-holding position;
   two first movement members, wherein each first movement member rotates a corresponding one of the eccentric camshafts to move the corresponding pair of jaws away from the bead core and outward in a radial direction of the bead core while the pair of jaws is holding one of the two ends of the filler;
   two second movement members, wherein each second movement member pivots a corresponding one of the support plates about the corresponding eccentric camshaft to move the corresponding pair of jaws, which has been moved by the corresponding first movement member, toward the other pair of jaws about the eccentric camshaft; and
   two third movement members, wherein each third movement member moves a corresponding one of the pairs of jaws, which has been moved by the corresponding second movement member, toward the bead core.

3. The method according to claim 1, wherein
   the end surfaces of the filler each include an inclined surface that is inclined in the thickness-wise direction between a front surface of the filler and a rear surface of the filler,
   the step of adhering the two end surfaces of the filler to each other includes adhering the inclined surfaces to each other,
   the inclined surface of one of the two end surfaces is inclined such that a thickness of the filler increases toward the front surface, and
   the inclined surface of the other one of the two end surfaces is inclined such that the thickness of the filler decreases toward the front surface.

* * * * *